United States Patent
Purden et al.

(10) Patent No.: US 9,231,310 B2
(45) Date of Patent: Jan. 5, 2016

(54) RADAR SENSOR ANTENNA WITH ANTI-REFLECTION ELEMENT

(71) Applicant: DELPHI TECHNOLOGIES, INC., Troy, MI (US)

(72) Inventors: George J. Purden, Westlake Village, CA (US); Shawn Shi, Thousand Oaks, CA (US)

(73) Assignee: Delphi Technologies, Inc., Troy, MI (US)

( * ) Notice: Subject to any disclaimer, the term of this patent is extended or adjusted under 35 U.S.C. 154(b) by 318 days.

(21) Appl. No.: 14/035,101

(22) Filed: Sep. 24, 2013

(65) Prior Publication Data

US 2015/0084803 A1   Mar. 26, 2015

(51) Int. Cl.
*H01Q 17/00* (2006.01)
*H01Q 1/32* (2006.01)
*H01Q 15/00* (2006.01)
*G01S 13/02* (2006.01)
*H01Q 1/38* (2006.01)
*H01Q 1/52* (2006.01)
*G01S 13/93* (2006.01)

(52) U.S. Cl.
CPC .............. *H01Q 17/00* (2013.01); *G01S 13/02* (2013.01); *H01Q 1/3283* (2013.01); *H01Q 1/38* (2013.01); *H01Q 1/52* (2013.01); *H01Q 15/0006* (2013.01); *G01S 13/931* (2013.01)

(58) Field of Classification Search
CPC .......... H01Q 17/00; H01Q 1/52; H01Q 1/38; H01Q 1/3283; H01Q 15/0006; G01S 13/02; G01S 13/931
USPC ............................................. 342/1–4, 70–72
See application file for complete search history.

(56) References Cited

U.S. PATENT DOCUMENTS

| | | | | |
|---|---|---|---|---|
| 6,897,819 | B2* | 5/2005 | Henderson | H01Q 1/3233 342/70 |
| 7,009,551 | B1* | 3/2006 | Sapletal | G01S 7/025 342/70 |
| 2002/0190891 | A1* | 12/2002 | Viana | B60K 31/0008 342/27 |
| 2005/0062660 | A1* | 3/2005 | Henderson | H01Q 1/3233 343/754 |
| 2006/0152405 | A1* | 7/2006 | Egri | G01S 7/292 342/70 |

(Continued)

FOREIGN PATENT DOCUMENTS

DE   10 2006 012452 A1   10/2007
EP   2 555 326 A1   2/2013

(Continued)

OTHER PUBLICATIONS

Marhefka, Ronald J.; Baertlein, B.A.; Rao, M.; Prakah-Asante, K., "Modeling the performance of automotive bumper mounted antennas," in Antennas and Propagation Society International Symposium, 2002. IEEE , vol. 3, no., pp. 316-319 vol. 3, 2002.*

(Continued)

*Primary Examiner* — John B Sotomayor
(74) *Attorney, Agent, or Firm* — Lawrence D. Hazelton

(57) ABSTRACT

An antenna for a radar sensor includes an emitter element, a receiver element, and an anti-reflection element. The emitter element is configured to direct the emitted signal along a boresight that intersects a fascia. The receiver element is configured to detect a reflected signal reflected by an object located beyond the fascia. The anti-reflection element is configured to reduce reflection by the antenna of an early-reflection portion reflected by the fascia.

13 Claims, 4 Drawing Sheets

(56) References Cited

U.S. PATENT DOCUMENTS

| | | | |
|---|---|---|---|
| 2013/0015999 A1* | 1/2013 | Alland | G01S 7/4026 342/70 |
| 2014/0091969 A1* | 4/2014 | Shi | G01S 13/931 342/385 |
| 2015/0084803 A1* | 3/2015 | Purden | H01Q 1/3283 342/1 |

FOREIGN PATENT DOCUMENTS

| | | |
|---|---|---|
| JP | 2008 249678 A | 10/2008 |
| JP | 2010 210297 A | 9/2010 |

OTHER PUBLICATIONS

European Search Report dated Apr. 2, 2015.

* cited by examiner

RADAR SENSOR ANTENNA WITH ANTI-REFLECTION ELEMENT

TECHNICAL FIELD OF INVENTION

This disclosure generally relates to an antenna for a radar sensor, and more particularly relates to equipping the antenna with an anti-reflection element to reduce reflection by the antenna of early-reflections caused by a fascia or other close object.

BACKGROUND OF INVENTION

It is known to place a radar sensor behind a fascia of a bumper of a vehicle for detecting objects proximate to (i.e. in front of or behind) the vehicle. As used herein, the fascia is a decorative cover placed over the impact absorbing portion of a modern bumper assembly. The fascia is generally for making the vehicle more attractive. Such a fascia is typically formed of a polymeric compound so that an emitted signal output by the radar sensor can propagate through the fascia toward an object proximate to the vehicle, and a reflected signal reflected by that object can propagate back through the fascia to be detected by the radar sensor. The configuration (e.g. material(s), thickness, orientation) of the fascia is typically selected to minimize interference with the electromagnetic signals propagating through the fascia. However, some reflection of the emitted signal by the fascia may be unavoidable for a number or reasons. This form of signal reflection is sometimes characterized as an early reflection by the fascia of the emitted signal output by the radar sensor. This early reflection may reflect back and forth between the antenna and the fascia, and possibly interfere with the detection of the reflected signal reflected by an object on the other side of the fascia. It has been proposed to place or apply electromagnetic energy absorbing material proximate to the antenna at the locations that don't interfere with transmitting or receiving electromagnetic signals, but do help to absorb this early reflection. However, adding such absorbing material adds undesirable cost to the radar sensor.

SUMMARY OF THE INVENTION

In accordance with one embodiment, an antenna for a radar sensor is provided. The antenna is configured to emit an emitted signal. A fascia proximate to the antenna reflects an early-reflection portion of the emitted signal toward the antenna. The antenna includes an emitter element, a receiver element, and an anti-reflection element. The emitter element is configured to direct the emitted signal along a boresight that intersects the fascia. The receiver element is configured to detect a reflected signal reflected by an object located beyond the fascia. The anti-reflection element is configured to reduce reflection by the antenna of the early-reflection portion.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
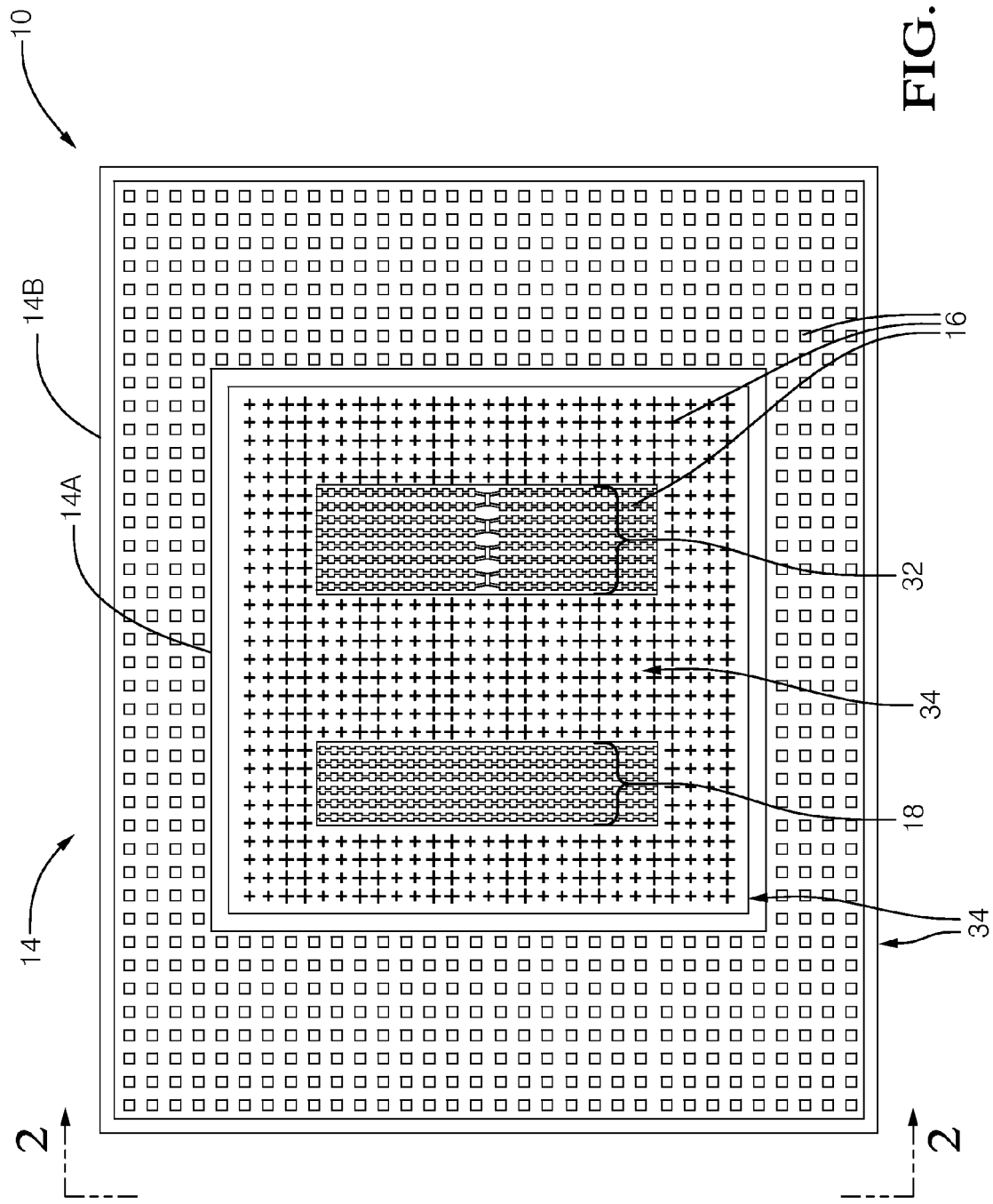
FIG. 1 is a front view of an antenna for a radar system in accordance with one embodiment.

FIG. 1 illustrates a non-limiting example of an antenna 10 for a radar sensor that is, for example, part of an object detection system on a vehicle (not shown). Such a system may be used to warn or alert an operator of the vehicle of an object (e.g. pedestrian, stopped vehicle, debris, etc.) in the travel path of the vehicle, or assist a cruise control system to maintain a safe distance from a leading vehicle traveling on the same roadway, or assist an automated parking system used to maneuver the vehicle into a parking place. In the non-limiting example described below, the antenna 10 is part of a bumper assembly of the vehicle, and is located behind a fascia 12 (FIG. 2), for example a front bumper fascia.

In general, the antenna 10 includes, or is built upon, a substrate 14. The substrate 14 may be any material suitable for supporting the various shapes or patterns of conductive material that form various electromagnetic elements of the antenna 10. In this non-limiting example, the substrate 14 includes a first substrate 14A overlaying a second substrate 14B, the advantages of which will become apparent in the description that follows. Suitable materials for the first substrate 14A include glass re-enforced hydrocarbon/ceramic, polytetrafluoroethylene (PTFE) with ceramic filler, and glass re-enforced PTFE in order to provide electromagnetic energy loss characteristics more amenable for fabricating an antenna of a radar sensor. By way of example and not limitation, the substrate may be formed of RO4350B, RO3003, or RT5880 from Rogers Corporation of Chandler, Ariz., USA; or TLY5 substrate material available from Taconic Advanced Dielectrics Division (ADD) located in Petersburgh, N.Y., USA. The various elements of the antenna 10 described in more detail below may be formed of copper foil 16 using well-known photo-lithography techniques used to fabricate printed circuit boards.

As it may be preferable the first substrate 14A to be relatively thin, less than one millimeter (1 mm) for example, the antenna 10 may include the second substrate 14B to provide structural support for the first substrate 14A. By way of example, the second substrate may be formed of, for example, the well-known FR-4 glass-reinforced epoxy laminate sheets commonly used to fabricate printed circuit boards. It is recognized that FR-4 may not have the preferred characteristics for some configurations of the anti-reflection element 34 described herein. Forming the first substrate 14A and the second substrate 14B of the suggested material is advantageous as various shapes of copper foil 16 can be readily formed using known photolithography techniques used to form various features of the antenna 10.

Figure 2:
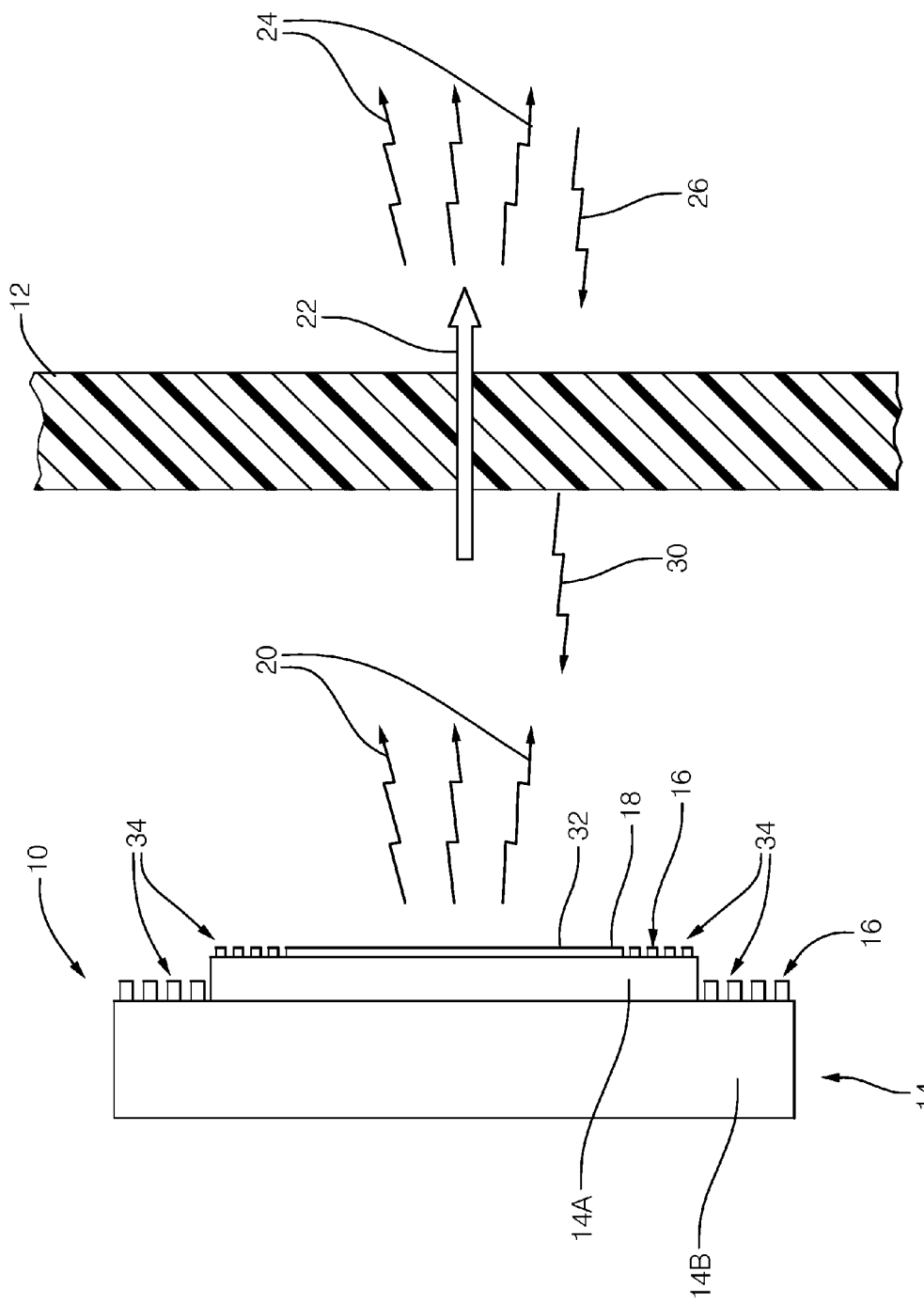
FIG. 2 is a side view of the antenna of FIG. 1 with a fascia that reflects a portion of a signal emitted by the antenna in accordance with one embodiment.

Continuing to refer to FIGS. 1 and 2, one of the elements of the antenna 10 may be an emitter element 18 configured to direct an emitted signal 20 along a boresight 22 that intersects the fascia 12. In order for the radar sensor to be as effective as possible, the fascia 12 is typically configured so that most of the energy in the emitted signal passes through the fascia 12 to form a radar signal 24 that 'illuminates' objects (not shown) proximate to the vehicle. These objects may reflect the radar signal 24 to generate a reflected signal 26 that may be detected by a receiver element 32 of the radar sensor. While distinct elements are illustrated for the emitter element 18 and the receiver element 32, it is recognized that a common element could be used for both emitting the emitted signal 20 and detecting the reflected signal 26 by multiplexing the signal emission and detection operations. Two distinct elements are illustrated only for the purpose of considering what sort of anti-reflection element may be suitable to be placed between the emitter element 18 and the receiver element 32.

As it is often the case that the fascia 12 is less than perfectly transparent to the emitted signal 20, the fascia 12 typically reflects an early-reflection portion 30 of the emitted signal 20 toward the antenna 10. The receiver element 32 is generally configured to detect the reflected signal 26 reflected by an object located beyond (i.e. on the other side of) the fascia 12. However, the early-reflection portion 30 may combine with the reflected signal 26 at the receiver element 32 and thereby add noise to or interfere with detection of the object by the radar sensor. If the early-reflection portion 30 consisted of only energy directly reflected by the fascia 12, that is energy that only traveled from the emitter element 18 to the fascia 12 and back to the receiver element 32, then it may be a relatively simple task to compensate the signal detected by the receiver element 32. However, it has been observed that some of the energy is reflected by the antenna 10, and so can echo back and forth between the antenna 10 and the fascia 12 multiple times before combining with the reflected signal 26 at the receiver element. As such, the content of the signal detected by the receiver element that is due to the early-reflection portion 30 being re-reflected by the antenna 10 is uncertain. It should be evident that the compensation necessary to avoid signal interference caused by such multiple reflections or echoes would be difficult to predict.

In order to reduce the amount of energy reflected by the antenna 10 back toward the fascia in a manner that can further complicate the detection of the reflected signal 26, the antenna 10 includes an anti-reflection element 34 configured to reduce reflection by the antenna 10 of the early-reflection portion 30. The illustrations of the anti-reflection element 34 as various arrangements of shapes of the copper foil 16 are non-limiting examples. As will be described in more detail below, the anti-reflection element 34 may be formed by an arrangement of, but not limited to, one or more square patches, circular patches, straight lines (dipoles), crosses (crossed dipoles), square loops, and circles. Furthermore, the various patches may include other feature details such as loading elements, commonly known as stubs, to further adjust electromagnetic response characteristics of the various shapes used to provide the anti-reflection element 34.

In the description that follows, three general categories of the anti-reflection element 34 are described. It should be recognized that various forms of the anti-reflection element 34 described herein are generally limited to what can be formed using the same materials and processes used to form the emitter element 18 and the receiver element 32. As such, any anti-reflection materials or devices that function in a manner similar to the anti-reflection element 34 described herein, but is added to or over the antenna 10 by way of a distinct process or formed of materials distinct from those used to form the emitter element 18 and the receiver element 32, is specifically excluded from the definition of the anti-reflection element 34 set forth herein. An example of what is excluded is Reticulated Foam Absorber available from Western Rubber & Supply, Inc. of Livermore, Calif., USA.

Figure 3:
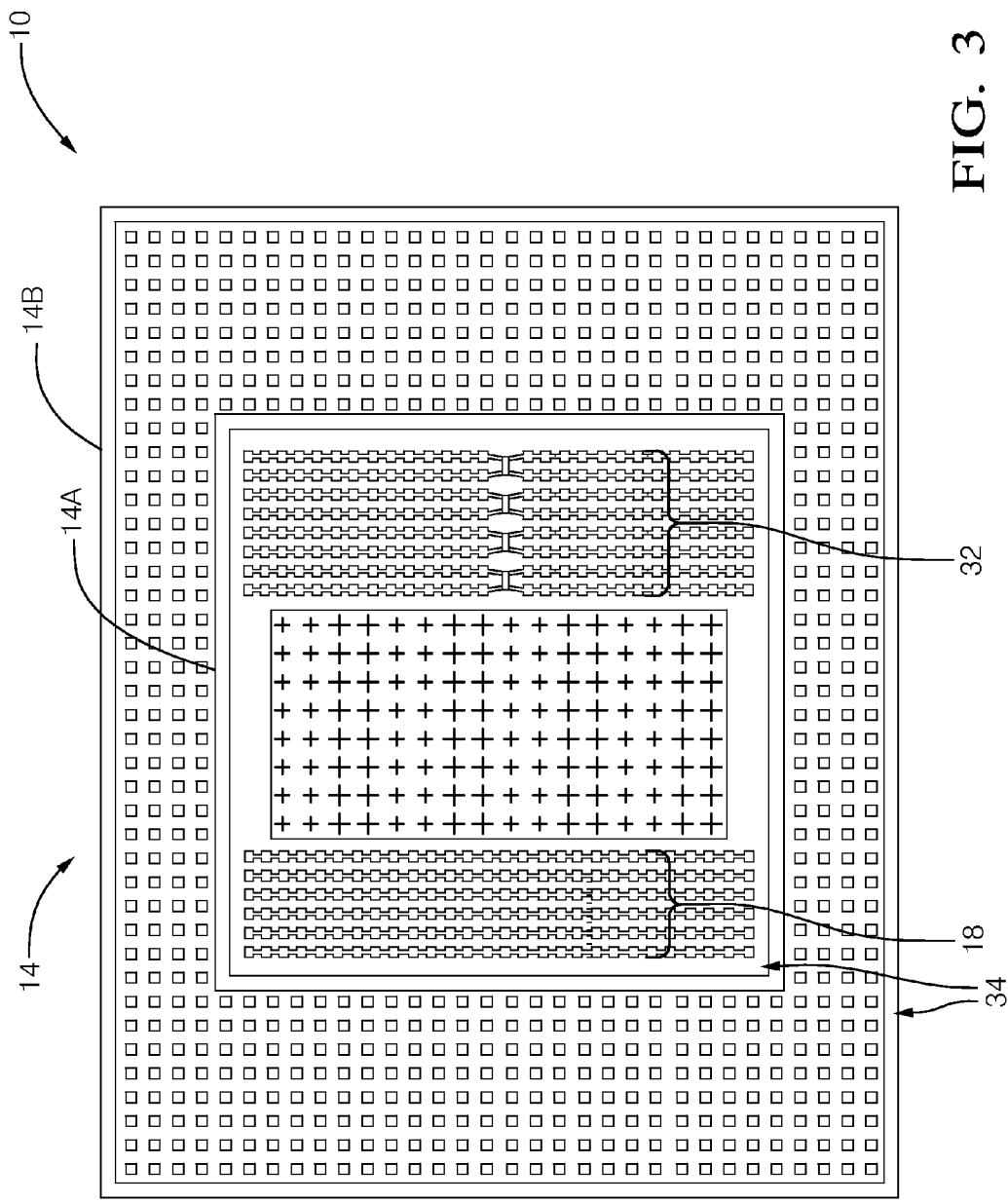
FIG. 3 is a front view of an alternative antenna for a radar system in accordance with one embodiment.

FIG. 3 illustrates another non-limiting example of the antenna 10. In this example, the anti-refection element 34 on the first substrate 14A does not surround the emitter element 18 and the receiver element 32 as was illustrated in FIG. 1. Such a configuration may advantageously reduce cost as the various suggested materials for the first substrate 14A are generally more costly than the FR-4 material suggested for the second substrate 14B. Alternatively, the antenna 10 may be configured to have only one substrate layer, only the first substrate 14A for example. The first substrate 14A could then be configured to provide the emitter element 18 and the receiver element 32, and any suitable versions of the anti-reflection element 34 between or surrounding the emitter element 18 and the receiver element 32. In some instances, such a configuration may be less costly than the two layer version of the substrate 14, even if the material used for the single layer is more expensive per unit area than FR-4.

Figure 4:
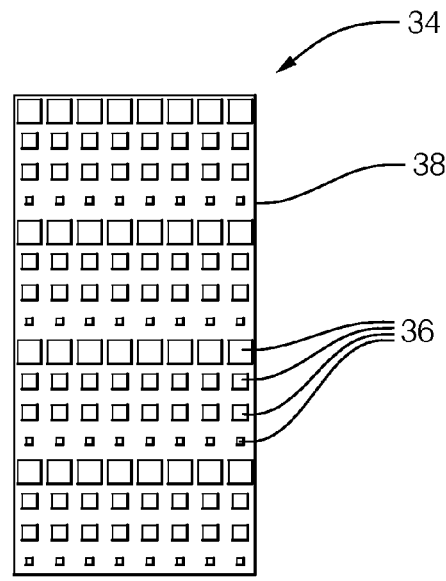
FIG. 4 is a front view of an anti-reflection element on the antenna of FIG. 1 or 3 in accordance with one embodiment.

FIG. 4 illustrates a non-limiting example of an anti-reflection element 34 that includes an arrangement of various sized reflective patches 36 that are formed of copper foil, preferable the same material used to form the emitter element 18 and the receiver element 32. The anti-reflection element 34 shown is a redirection array 38 configured to redirect reflectively the early-reflection portion 30 away from the boresight 22. In this example, the progression sizes of the reflective patches 36 cooperate to redirect reflectively the early-reflection portion 30 in an upward direction away from the boresight 22. By way of example and not limitation, for a 77 GHz radar signal, the redirection array 38 may be located on a section of the first substrate 14A that is formed of three-hundred-thirty micrometer (330 um) thick TLY5. In this example, the reflective patches 36 are spaced apart two millimeters (2 mm) on-center, and the progression of square patches sizes are 1.68 mm, 1.07 mm, 0.97 mm, and 0.46 mm. Such a redirection array would redirect reflective energy that impinges on the redirection array from a direction parallel to the boresight 22 (i.e. normal to the plane of the first substrate 14A) at an angle of thirty degrees (30°) away from the boresight 22. It is recognized that the reflective patches 36 could have shapes other than square, and use a progression of reflective patch sizes other than those suggested herein to form the redirection array 38. While not subscribing to any particular theory, the size of a reflective patch is thought to determine the phase of electromagnetic energy reflected by the reflective patch. The progressive variation causes reflected energy from each reflective patch to combine destructively to reduce the amount of energy reflected along the boresight 22, and combine constructively in a direction away from the boresight 22.

Figure 5:
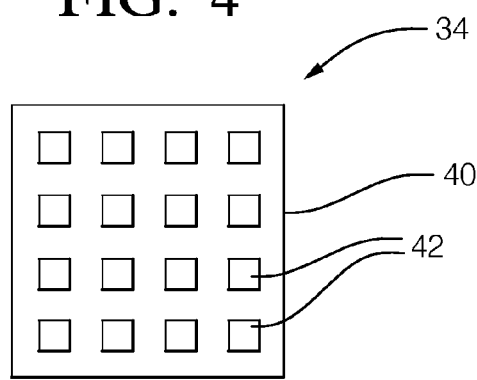
FIG. 5 is a front view of an anti-reflection element on the antenna of FIG. 1 or 3 in accordance with one embodiment.

FIG. 5 illustrates a non-limiting example of an anti-reflection element 34 that includes an arrangement of one or more resonant patches 40 to form an absorbing array 42 configured to absorb the early-reflection portion 30. The absorbing array 42 is preferably arranged on a substrate (e.g. the second substrate 14B) formed of FR-4 one millimeter to two millimeters (1 mm-2 mm) thick. This non-limiting example of using FR-4 is proposed as FR-4 is generally considered to be a relatively lossy material for radar signals, and so aids the resonant patches 40 with absorbing the early-reflection portion 30. It may be preferable to include an optional 0.1 mm thick first layer. Including such a layer may be advantageous to allow absorption of signals at frequencies with millimeter wavelengths, e.g. 77 GHz. The resonant patches 40 operate to dissipate energy into the substrate. Suitable dimensions for a 77 GHz absorbing array on a 1.5 mm thick substrate with a 0.1 mm first layer are 0.91 mm square patches with 2 mm center to center spacing. It is recognized that the resonant patches 40 could have shapes other than square, and use sizes other than those suggested herein to form the absorbing array 42.

Figure 6:
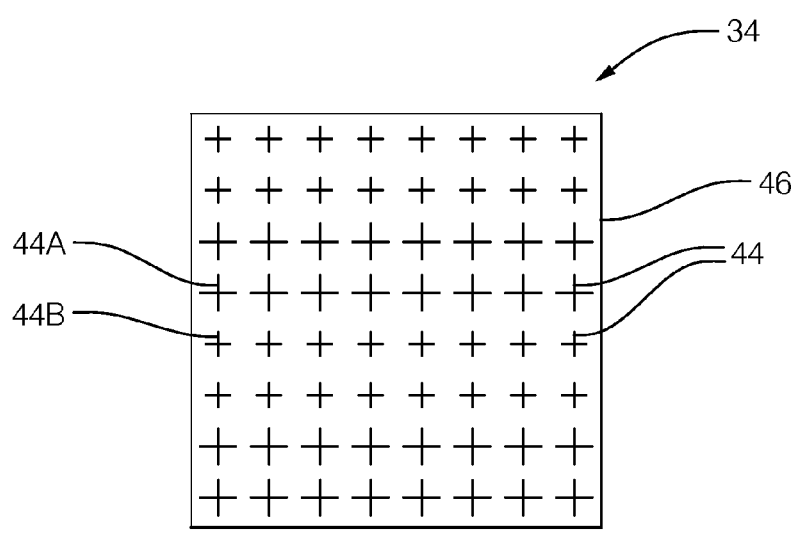
FIG. 6 is a front view of an anti-reflection element on the antenna of FIG. 1 or 3 in in accordance with one embodiment.

FIG. 6 illustrates a non-limiting example of an anti-reflection element 34 that includes an arrangement of one or more reflective patches 44 that are formed of copper foil, preferable the same material used to form the emitter element 18 and the receiver element 32. The anti-reflection element 34 shown is a nulling array 46 configured to reflect the early-reflection portion 30 along the boresight 22 with a combination of the reflective patches 44 that causes the reflected signals to combine destructively and thereby minimize the amount of the early-reflection portion 30 that is reflected along the boresight 22. In general, the anti-reflection element 34 includes a nulling array 46 configured to reflect a first portion of the early-reflection portion 30 at a first phase, and reflect a second portion of the early-reflection portion 33 at a second phase distinct from the first phase. In this non-limiting example, the nulling array 46 has two sizes of reflective patches: 44, 1.14 mm crossed dipoles and 1.73 mm crossed dipoles, which are arranged with a 2.74 mm center-to-center spacing. The two example sizes result in the second phase being opposite the first phase, i.e. 180° of phase difference. As such, the nulling array includes a first patch 44A configured to reflect the first portion at the first phase, 0° of phase shift for example, and a second patch 44B configured to reflect the second portion at the second phase, 180° of phase shift relative to the phase of the early-reflection portion 30. It is recognized that the reflective patches 44 could have shapes other than crossed dipoles, a single (uncrossed) dipole for example.

Accordingly, an antenna 10 for a radar sensor is provided. The antenna 10 includes one or more of several types of the anti-reflection element 34 described herein. By including the anti-reflection element 34 on the antenna, the potential for signal degradation caused by the early-reflection portion 30 bouncing back-and-forth between the antenna 10 and the fascia 12 is reduced, without having to add additional components or materials such as energy absorbing foam or the like.

While this invention has been described in terms of the preferred embodiments thereof, it is not intended to be so limited, but rather only to the extent set forth in the claims that follow.

We claim:

1. An antenna for a radar sensor configured to emit an emitted signal, wherein a fascia reflects an early-reflection portion of the emitted signal toward the antenna, said antenna comprising:

an emitter element configured to direct the emitted signal along a boresight that intersects the fascia;

a receiver element configured to detect a reflected signal reflected by an object located beyond the fascia; and an anti-reflection element configured to reduce reflection by the antenna of the early-reflection portion.

2. The antenna in accordance with claim 1, wherein the anti-reflection element includes a redirection array configured to redirect reflectively the early-reflection portion away from boresight.

3. The antenna in accordance with claim 2, wherein the redirection array includes a plurality of reflective patches that cooperate to reflect the early-reflection portion away from the boresight.

4. The antenna in accordance with claim 1, wherein the anti-reflection element includes one or more resonant patches to form an absorbing array configured to absorb the early-reflection portion.

5. The antenna in accordance with claim 4, wherein the one or more resonant patches are configured to dissipate energy into a substrate of the antenna.

6. The antenna in accordance with claim 1, wherein the anti-reflection element includes a nulling array configured to reflect a first portion of the early-reflection portion at a first phase, and reflect a second portion of the early-reflection portion at a second phase distinct from the first phase.

7. The antenna in accordance with claim 6, wherein the second phase is opposite the first phase.

8. The antenna in accordance with claim 6, wherein the nulling array includes a first patch configured to reflect the first portion at the first phase and a second patch configured to reflect the second portion at the second phase.

9. The antenna in accordance with claim 8, wherein the first patch and the second patch are configured to reflect the early-reflection portion along the boresight.

10. The antenna in accordance with claim 8, wherein the first patch includes one or more open circuit stubs.

11. The antenna in accordance with claim 8, wherein the first patch is a dipole configured to reflect the first portion at the first phase.

12. The antenna in accordance with claim 8, wherein the first patch is a crossed dipole configured to reflect the first portion at the first phase.

13. The antenna in accordance with claim 6, wherein the first phase corresponds to zero degrees (0°) of phase shift relative to the early-reflection portion and the second phase corresponds to one-hundred-eighty degrees (180°) of phase shift relative to the early-reflection portion.

\* \* \* \* \*